(12) United States Patent
Dinsing et al.

(10) Patent No.: US 11,973,767 B2
(45) Date of Patent: Apr. 30, 2024

(54) MONITORING A SECURE COMMUNICATION PARTNER

(71) Applicant: ROHDE & SCHWARZ GMBH & CO. KG, Munich (DE)

(72) Inventors: Karl Dinsing, Munich (DE); Matthias Haubs, Neubiberg (DE); Thomas Richter, Lauf a. d. Pegnitz (DE)

(*) Notice: Subject to any disclaimer, the term of this patent is extended or adjusted under 35 U.S.C. 154(b) by 295 days.

(21) Appl. No.: 17/287,884

(22) PCT Filed: Dec. 19, 2018

(86) PCT No.: PCT/EP2018/085951
§ 371 (c)(1),
(2) Date: Apr. 22, 2021

(87) PCT Pub. No.: WO2020/125978
PCT Pub. Date: Jun. 25, 2020

(65) Prior Publication Data
US 2021/0352086 A1 Nov. 11, 2021

(51) Int. Cl.
*H04L 9/40* (2022.01)
*H04W 12/67* (2021.01)

(52) U.S. Cl.
CPC ......... *H04L 63/1408* (2013.01); *H04W 12/67* (2021.01)

(58) Field of Classification Search
CPC ............. H04L 63/0428; H04L 63/1408; H04L 63/1416; H04W 12/02; H04W 12/67
See application file for complete search history.

(56) References Cited

U.S. PATENT DOCUMENTS

| | | | |
|---|---|---|---|
| 2010/0005179 A1* | 1/2010 | Dickson | H04L 63/30 709/228 |
| 2012/0137368 A1* | 5/2012 | Vanstone | G06F 21/60 726/25 |
| 2012/0329426 A1 | 12/2012 | Kario et al. | |
| 2015/0304288 A1* | 10/2015 | Balasaygun | H04L 63/20 713/151 |

FOREIGN PATENT DOCUMENTS

| | | |
|---|---|---|
| CN | 105956742 A | 9/2016 |
| EP | 2458521 A1 | 5/2012 |
| EP | 2642711 A1 | 9/2013 |
| WO | 2017112933 A1 | 6/2017 |

OTHER PUBLICATIONS

International Search Report and Written Opinion, PCT/EP2018/085951, dated Sep. 5, 2019, 11 pages.

* cited by examiner

*Primary Examiner* — Theodore C Parsons
(74) *Attorney, Agent, or Firm* — Carlson, Caspers, Vandenburgh & Lindquist, P.A.

(57) ABSTRACT

Evaluation of security of a communication system. The security of the communication system is continuously monitored and the result of this assessment is indicated. In particular, characteristic security information provided by a communication partner may be continuously received and evaluated for determining the security status. In this way, a change of the security status can be immediately recognized. Thus, a transmission of sensible or confidential data over an insecure communication network can be avoided.

13 Claims, 2 Drawing Sheets

MONITORING A SECURE COMMUNICATION PARTNER

TECHNICAL FIELD

The present invention relates to a communication system for monitoring a secure communication. The present invention further relates to a method for monitoring a secure communication.

BACKGROUND

Although applicable in principle to any communication system, the present invention and its underlying problem will be hereinafter described in combination with voice or messaging communication system.

Communication systems are used for exchanging any kind of information, for example messages or voice data. At least some of the information exchanged by communication systems may relate to sensitive or confidential information. Accordingly, sensitive information has to be protected during transmission. It is for this purpose that the transmission path between the communication partners has to be protected. Further, it must be ensured that only trusted persons are located at the terminals of the communication system. Transmission of sensitive data should be only performed if all desired security requirements are fulfilled.

However, modern communication systems may include mobile communication terminals. Furthermore, flexible transmission paths may be applied between individual communication partners. Due to such requirements, it becomes difficult to ensure a desired degree of confidentiality. In particular, the degree of confidentiality may even change over time. For example, a mobile terminal may move around, which may require the use of changing transmission paths.

Against this background, a problem addressed by the present invention is to provide a continuous monitoring of the security status of a communication between multiple nodes. In particular, the present invention aims to continuously assess the security status of confidential communication between multiple communication partners.

SUMMARY

The present invention solves this problem with a communication system and a method for monitoring a secure communication with the features of the independent claims. Further advantageous embodiments are subject-matter of the dependent claims.

According to a first aspect, a communication system, in particular a communication system for monitoring a secure communication is provided. The communication system comprises a first node and at least one second node. The first node is communicatively coupled with the at least one second node by a transmission path. The first node comprises a monitoring device and an indication device. The monitoring device is adapted to continuously monitor a security status of the at least one second node. The indication device is adapted to indicate the continuously monitored security status. The security status may indicate a degree of security protection of a communication link between the first node and the at least one second node.

According to a further aspect, a method for monitoring a secure communication is provided. The method may monitor a secure communication of a communication system comprising a first node and at least one second node. The first node and the at least one second node are communicatively coupled by a transmission path. The method comprises continuously monitoring a security status of the at least one second node by a monitoring device of the first node. The method further comprises indicating the continuously monitored security status by an indication device of the first node. The security status may indicate a degree of security protection of a communication link between the first node and the at least one second node.

The present invention is based on the fact that a security level, i.e. a degree of privacy, of a communication between multiple communication partners may change over time. For example, the security level may take into account a security level of users located at the related terminals. In this case, the security level may change when a user with a particular security level may arrive at a terminal or leave the terminal. Thus, authentication of a user might be taken into account when assessing the overall security status of a communication.

Furthermore, a moving mobile terminal may use changing communication links during the movement of the terminal. Since different communication links may relate to different security levels, the overall security level of a communication link may also change over time when at least one device changes which is related in the communication between multiple terminals. Furthermore, a communication path between two terminals may also change over time for many reasons. For example, a failure of an intermediate device such as a router, gateway or the like may require another route between the terminals. Furthermore, the route may also change due to other reasons, for example bandwidth or the like.

Hence, it is an idea of the present invention to take into account the above mentioned observations and to provide a continuous monitoring of a security level of a communication system. In this way, a change of the security level can be recognized immediately. For example, transmission of confidential data may be stopped upon detecting the security level falling below a specific threshold. In the other way around, it may be possible to start a secure communication only after detecting that the security level exceeds a specific threshold. In this way, it is possible to ensure that the privacy of sensible data is not violated.

The first node and the at least one second node may be, for example, terminals of a communication system. In particular, the first node and the second nodes may be terminals for establishing a secure communication. For example, any kind of data, in particular digital data, may be encrypted before transmission, and the related communication partner may receive the encrypted data and decrypt the received encrypted data. For this purpose, any kind of encryption/decryption may be applied. For example, a secret key may be used for encrypting and decrypting the data. The required keys may be provided in any appropriate form. For example, keys may be stored on a smartcard or the like. However, it is understood that any other scheme for providing or distributing keys for encrypting/decrypting data may be also possible.

Furthermore, the first node and the at least one second node may apply an authentication of a user. For this purpose, any appropriate authentication scheme may be possible. For example, a user may be authenticated by a pin code, a passphrase or the like. However, any other appropriate authentication scheme, for example biometric data, inserting a chipcard, etc. may be also possible.

The communication system may be used for transmitting any kind of data, for example acoustic data such as voice data, video data, images or any other kind of data, in particular any kind of digital data. The data may be transmitted, for example by a packet based transmission protocol. However, it may be also possible to provide a continuous data stream or any other scheme for transmitting the data.

The encryption and decryption of the data may be performed in the first node and the at least one second node by hardware or software. It is understood that the further functionalities of the individual nodes may be also realized by hardware or software. For example, each node may comprise a processor and a memory communicatively coupled to the processor for storing instructions that cause the processor to perform the desired operations. The processor may further execute an operating system that loads and executes the instructions. The processor may, for example be an Intel processor that runs an operating system that loads and executes the instructions stored in the memory.

The nodes, in particular the first node and the at least one second node may be communication devices at a fixed spatial position. However, it is also possible that at least one of the nodes may be a mobile device. For example, the mobile device may be a communication device which is mounted on a mobile platform, for example a car, a truck, a vessel, an aircraft, etc. Furthermore, it might be possible that at least one of the nodes is a portable communication device.

The first node and the at least one second node may be communication devices using any appropriate communication technology. For example, the nodes may be communication devices connected by a local communication network. In particular, the local communication network may be, at least in part, a wired communication network. However, the nodes may be also communication devices in a distributed communication network. For example, the communication network may use, at least in part, wireless communication links such as mobile communications, e.g. GSM, UMTS, LTE, WLAN, SATCOM, or any other wireless communication standard. Furthermore, it may be also possible to use proprietary communication links. The communication between the individual nodes, in particular the first node and the at least one second node, may be performed, for example by a packet based data communication. However, any other transmission scheme may be also possible.

For monitoring the security status of the communication between the first node and the at least one second node, the first node may continuously monitor the security status of the communication link to the at least one second node. In this connection, the expression "continuously" means that the security status is not only determined once when establishing the connection between the first node and the at least one second node, but also further times as long as a communication link between the first node and the at least one second node is established. For example, the monitoring device of the first node may periodically determine the security status. In an example, the security status is determined in predetermined time intervals, for example 1 second, 10 seconds, 30 seconds, 1 minute, 2 minutes, 5 minutes, etc. However, it is understood that any other time interval may be also possible. Alternatively, it may be also possible to re-evaluate the security status each time a change in the configuration, in particular a change in the communication link between the first node and the at least one second node has been occurred or detected. Furthermore, it may be also possible to take into account each change in the configuration of the first node or the at least one second node. For example, another user may authenticate at the first node or the at least one second node which may also be taken into account for assessing the security status.

The determination of the security level may take into account a configuration of the individual nodes, in particular the first node and the at least one second node. For example, the security level may be determined based on the applied encryption scheme, the key data used for encryption, a security status of further devices connected to the first node or the at least one second node, or a security level of a user which has been authenticated. Furthermore, the security level may also take into account the transmission paths between the first node and the at least one second node. For example, the security level may be determined based on an evaluation of intermediate devices such as relays, gateways, switches, etc. Furthermore, it may be possible to evaluate the security level of the transmission channels. For this purpose, it may be possible to consider the security level of related wired or wireless communication channels.

The determined security status, in particular the continuously monitored security status of the at least one second node or the current communication link to the at least one second node may be indicated at the first node. It may be possible to provide this indication of the determined security status in any appropriate manner. For example, an optical indication may be provided. The optical indication may be provided, for example by a lamp or a light emitting diode (LED). In a very simple example, the lamp may be switched on or off. Furthermore, it may be possible to change a color of the indication depending on the determined security status. For example, a red sign may indicate an insecure security status, a green sign may indicate a secure communication, and a yellow color may indicate limited security. Furthermore, it may be also possible to display the security status in any other appropriate manner. For example, the security status may be indicated by a numerical value, a bar graph, in text form or any other appropriate scheme. Additionally or alternatively, the security status may be also indicated in any other appropriate form, for example by an acoustical signal. For example, an acoustical alert may be provided when the security level is below a predetermined threshold value or an insecure communication has been detected.

Further embodiments of the present invention are subject of the further sub claims and of the following description, referring to the drawings.

In a possible embodiment, the transmission path comprises at least one of wired communication links, wireless communication links, relays, gateways, network bridges and switches.

The first node and the at least one second node may be communicatively connected with each other by any appropriate transmission path. The transmission path may be realized by wired communication links, wireless communication links or a combination of wired or wireless communication links. Furthermore, additional devices such as gateways, network bridges, relays, switches, etc. may be also included in the transmission path between the first node and a second node. In particular, the transmission path may change over the time. In other words, the elements included in the transmission path between the first node and a second node may change. For example, a node may be a mobile node with a moving spatial position. Thus, at least one segment of the transmission path may change during the movement. Furthermore, some parts of the transmission path may also change due to other reasons, for example due to a failure of one component, or due to bandwidth requirements. However, it is understood that any other reason may also cause a change of the transmission path between two nodes. Accordingly, by continuously monitoring the security level, it is possible to immediately recognize a change of the security level when at least one element of the transmission path and the related security level changes.

In a possible embodiment, the first node and the at least the one second node are communicatively coupled by a transmission path comprising at least two parts. In this case, the monitoring device may be configured to continuously monitor the security status based on the individual security levels of the at least two parts of the transmission path.

When using a transmission path which comprises multiple segments, the security status of each segment of the transmission path may be analyzed separately, and an overall security status may be determined taking into account the security status of each segment. In this way, it is possible to identify a risk caused due to a low security status in one segment of the transmission path, and to adapt the overall security status accordingly.

In a possible embodiment, the indication device is adapted to generate an alert, if the security status is below a predefined threshold level.

The alert may be any kind of appropriate alert. For example, the alert may be an optical alert or an acoustical alert. For example, a light having a predetermined color, for example red, may be activated upon detecting a security level below a predetermined threshold. Additionally or alternatively, an acoustical signal, for example a warning tone may be output if the security level falls below the threshold level. However, it is understood that any other kind of appropriate alert may be also generated. In this way, a user may immediately recognize a security risk and stop a transmission of sensitive data upon the security level falls below a required threshold level.

In a possible embodiment, the security status of the at least one second node may be determined out of at least two predetermined security levels.

By specifying a number of at least two predetermined security levels, the predefined security levels may be used for specifying the security status, in particular the security status of the at least one second node. In this way, a predetermined reliability or trustworthiness may be associated with each predefined security level. Thus, sensitive or confidential data may require a minimum security level out of the number of predefined security levels.

In a possible embodiment, a communication between the first node and the at least one second node may comprise a packet based communication.

Accordingly, the data between the first node and the at least one second node may be transmitted by specific data packets. For example, the communication may be based on an IP based communication.

In a possible embodiment, the monitoring device is configured to compute an individual security status for each message transmitted through the communication system.

The continuously monitoring of the security status may perform at least a separate determination of the security status for each message which is transmitted through the communication system, in particular from the first node to a second node or from a second node to the first node. A message may comprise one or a number of two or more data packets. For example, each message may comprise a predetermined number of data packets. However, it may be also possible that the number of data packets may be variable for each message.

In a possible embodiment, the first node may comprise a verification device. The verification device may be adapted to compare the determined security level with a predetermined minimum security level. If the determined security level is less than a predetermined minimum security level, the verification device may reject a communication.

The minimum security level may be a predetermined fixed security level, or a minimum security level which is defined for each message separately. Furthermore, it may be possible to define the minimum security level depending on other requirements. A user may specify a minimum security level manually. The verification device may compare the continuously monitored security status with the required minimum security level. Only if the requirements, i.e. a security status higher or equal to a required minimum predetermined security level is fulfilled, a communication between the first node and at least one second node may be established.

In a possible embodiment, the first node comprises a configuration device. The configuration device may be adapted to set the first node and/or the at least one second node according to a predetermined minimum security level requirement.

For example, a specific encryption scheme may be applied to achieve a desired minimum security level. Furthermore, it may be possible to limit the communication path between the first node and the at least one second node to specific communication channels, or to avoid unsecured device in the communication path. For example, devices such as gateways, relays, switches, etc. having a low security level must be avoided in order to achieve a secure communication between the first node and the at least one second node with a predetermined minimum security level. However, it is understood that any other kind of requirement for achieving a predetermined minimum security level may be also possible.

In a possible embodiment, the at least one second device is adapted to provide characteristic information related to a security level of the second device. The monitoring device may be configured to continuously receive the characteristic information provided by the at least one second node. The monitoring device may further determine the security status of the at least one second node based on the received characteristic information.

The characteristic information may be any kind of information which allows determining the security status. By analyzing the characteristic information, it is possible to determine an appropriate security status. For example, the received characteristic information may be compared with a set of predetermined relationships. The predetermined relationships may be stored, for example in a memory of the first node, in particular in a memory of the monitoring device. Accordingly, by identifying appropriate relationship between the received characteristic information and a corresponding security status, an appropriate security status of the at least one second device can be easily determined.

In a possible embodiment, the characteristic information may comprise at least one of authentication of a user, configuration parameter of the related second node, a checksum or information related to a transmission path.

For example, a user at the at least one second device may be authenticated by a password, pin, passphrase, biometric data, a keycard, in particular a chipcard or the like, or any other appropriate scheme. A configuration parameter related to the second node may comprise information relating to an applied encryption scheme, e.g. a length of an applied encryption key, an identification of the encryption algorithm, etc. Moreover, the configuration parameter may also specify further information related with the security of the device, for example a checksum or hash value of a software version installed in the related second node, information regarding to further devices connected to the second node or any other appropriate information. The characteristic information provided by the at least one second node may also comprise information regarding to the transmission path. For example, the characteristic information may specify a direct communication partner of the respective second node. Furthermore, it may be possible to specify any other kind of information, for example information regarding a frequency band, signal strength, spatial position, etc.

In a possible embodiment, the monitoring device is configured to compute the security status of the at least one second node by comparing the received characteristic information with pre-stored security conditions.

As already mentioned above, the relationship between a security level and characteristic information received from the at least one second node may be stored in a memory of the first node, in particular of the monitoring device. Accordingly, the respective security level can be easily determined based on such relationship stored in a look-up table or the like.

In a possible embodiment, the system comprises at least two second nodes. In this case, the monitoring device may be configured to compute an aggregated group security level for a group of at least two second nodes.

By taking into account the security properties of each associated second node, an overall security status for the communication system comprising multiple nodes can be easily determined. The aggregated group security status may be determined based on all security related information. Thus, it is possible to take into account all relevant information for identifying the security status of the whole system. In particular, the security status of the whole system may decrease if only one element in the whole system has a low security level. Hence, security risks can be easily identified and indicated to the user accordingly.

In a possible embodiment, the monitoring device is configured to compute an individual security status for each node of the at least two second nodes. In this way, separate security status information may be provided for each second node. This allows a user to recognize different security levels for the communication with each of the multiple second nodes.

In a possible embodiment, the system comprises at least two second nodes, and the monitoring device is configured to automatically group a number of second nodes having a predetermined security level.

For example, a user may specify a predetermined security level and the monitoring device may automatically identify all second nodes having the specified predetermined security level or a security level which is equal or higher than the specified predetermined security level. The monitoring device may provide the group of identified second nodes to a user as a kind of preselection. Alternatively, the monitoring device may use the group of second nodes and automatically establish a communication between the first node and the second nodes of the group. However, it is understood that further limitations requirements may be also specified and the automatic grouping of the nodes may take into account the additional requirements together with the specified security level. In this way, the automatic grouping of the second nodes may be used as a kind of shortcut for accelerating the establishment of a communication or another operation.

With the present invention it is therefore now possible to continuously monitor a security status of a communication system comprising multiple communication partners. In particular, it is possible to immediately recognize a change of the security level upon one element in the configuration of the communication system changes. Due to the continuous monitoring of the security status, it is even possible to recognize a change in the security level during operation. Accordingly, if the security status changes, for example due to a movement of one communication partner, a change of the security level can be immediately recognized. Thus, it is possible to prevent transmission of sensible or confidential data if the security status decreases below a required minimum security level. Hence, the security of the communication is guaranteed, even if the configuration of the communication network changes over time.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The embodiments in the drawings are not necessarily shown in scale.

In the drawings, same, functionally equivalent and identical operating elements, features and components are provided with same reference signs in each case, unless stated otherwise.

DETAILED DESCRIPTION OF THE DRAWINGS

Figure 1:
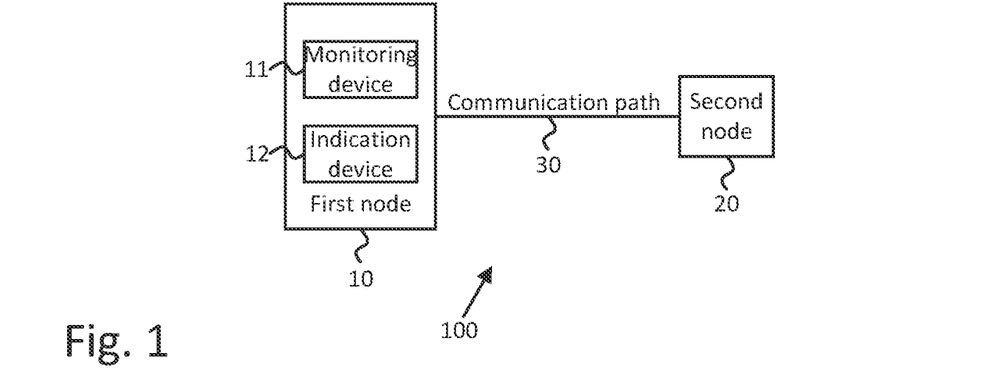
FIG. 1 shows a block diagram of an embodiment of a system according to the present invention.

FIG. 1 shows a block diagram of an embodiment of a communication system 100. The communication system 100 comprises a first node 10 and at least one second node 20. The first node 10 and the second node 20 may be connected with each other by a communication path 30. The first node 10 further comprises a monitoring device 11 and an indication device 12. The monitoring device 11 of the first node 10 may continuously monitor a security status of the communication system 100, in particular a security status of the at least one second node 20. The indication device 12 provides an indication of the continuously monitored security status. The security status which is monitored by the monitoring device 11 and indicated by the indication device 12 may be a security status indicating the degree of security protection of the communication link between the first node 10 and the second node 20.

The first node 10 and the second node 20 may be devices for any kind of secure communication. For example, the communication may be protected by using encryption, using a virtual private network (VPN) or applying any other kind of appropriate mechanism for a secure communication and avoiding unwanted interception. In order to further improve security, it may be possible to verify whether a user or a connected device at the first node 10 and the second node 20 is allowed to receive the transmitted data. For example, a user may be authorized by a password, a pin, passphrase, biometric authentication such as iris scan, fingerprint, etc., a specific authentication device, for example a keycard, RFID chip or the like or any other appropriate authentication mechanism. Furthermore, the configuration of the first node 10 and the second node 20 may be also taken into account for assessing the security status. For example, information regarding software installed on the nodes, in particular on the second node 20, may be also taken into account for assessing the security level. However, it is understood that any other information which may be relevant for the security of the communication may also be taken into account.

Additionally, information regarding the transmission path 30 may be also taken into account. For example, transmission path 30 may be a wired communication path between the first node 10 and the second node 20. Alternatively, at least a part of the transmission path 30 may be realized by an Over The Air (OTA) communication, for example by a wireless communication link such as a radio frequency transmission. For example, communication path 30 may comprise mobile communication using GMS, UMTS, LTE or the like. Furthermore, it may be also possible to use a satellite communication or local wireless communication, for example WLAN. Hence, information regarding the communication path 30 may be also taken into account when assessing the security status for the communication between the first node 10 and the second node 20.

The second node 20 may be a mobile communication terminal. For example, the second node 20 may be arranged on a mobile platform, such as a car, truck, vessel, aircraft, etc. Furthermore, second node 20 may be a portable mobile communication device. Thus, the counterpart of the second device 20 for a communication may change over time when the second node 20 is moving. Accordingly, when the counterpart of the second node 20 for the communication changes, the security status of the newly associated counterpart may be different from the security status of the previous counterpart, and consequently the overall security status may also change.

In order to always obtain a valid assessment of the security status for the communication between the first node 10 and the second node 20, monitoring device 11 of the first node 10 continuously monitors the security status of the communication with the second node 20. For this purpose, monitoring device 11 may receive from the second node 20 characteristic information related to the security of the communication. The characteristic information may comprise, for example, information about the configuration of the second node 20. For example, the characteristic information may comprise information about software installed on the second node 20, for example a hash value of the software, a software version or the like. Furthermore, the characteristic information may comprise information about further devices which are coupled to the second node 20. The characteristic information may also comprise information regarding to users which have been authorized to the second node 20. Furthermore, the characteristic information may specify information regarding the communication path between the first node 10 and the second node 20. In particular, the characteristic information may specify information about a counterpart of a communication link of the second node 20. For example, the information regarding the communication link may comprise information about a signal strength of a wireless communication link, a frequency or frequency band, a communication protocol which has been established between the second node and a counterpart, or any other information regarding the communication path. In particular, the characteristic information may also comprise information for specifying the whole communication path between the first node 10 and the second node 20. For example, as will be described in more detail below, the communication path 30 may comprise multiple segments and additional devices for coupling the individual segments. In this case, the characteristic information may comprise information for specifying each segment of the communication path 30 and the additional devices in this communication path. For example, the additional devices may be relays, gateways, routers, switches or the like.

Monitoring device 11 of the first node 10 may receive the characteristic information and analyze the characteristic information in order to determine the security status of the communication between the first node 10 and the second node 20. For example, monitoring device 11 may receive the characteristic information and compare the received characteristic information with pre-stored data. For example, correspondences between characteristic information and an associated security level may be pre-stored in a memory, for example a memory of monitoring device 11. By matching the received characteristic information with the pre-stored data, monitoring device 11 can determine an appropriate security status for the communication between the first node 10 and the second node 20. However, it is understood that any other appropriate scheme for determining the security status based on the received characteristic information may be also possible.

The security status may specify the security level of the communication between the first node 10 and the second node 20 in any appropriate manner. For example, the security status may differentiate between only two states. The first state may be classified as insecure, and a second state may be classified as secure. However, it may be also possible to differentiate between more than two different states.

The monitoring of the security status for the communication between the first node 10 and the second node 20 may be performed continuously. For example, monitoring device 11 may periodically determine the security status. For this purpose, monitoring device 11 may determine the security status in predetermined time intervals, for example each second, each 10 seconds, each minute, 5 minutes or any other appropriate time interval. Alternatively, it may be also possible to apply any other scheme for continuously monitoring the security status. For example, monitoring device 11 may determine the security status each time when a new message is transmitted from the first node 10 to the second node 20, or when a message is received from the second node 20 by the first node 10. If the transmission between the first node 10 and the second node 20 is performed by a packet based transmission, monitoring device 11 may perform an assessment of the security status depending on the number of transmitted packets. For example, a new determination of the security status may be performed after receiving or transmitting a predetermined number of packets. However, any other scheme for continuously monitoring the security status may be also possible.

Indicating device 12 may indicate the security status determined by the monitoring device 11 in any appropriate manner. For example, an optical signaling may be applied. In a very simple example, the optical signaling may differentiate between a first security status indicating an insecure communication and a second status indicating a secure status. For example, a lamp may be switched on if monitoring device 11 determines a secure communication, and the lamp is switched off if an insecure communication is determined. However, it may be also possible to change a color of a signaling depending on the determined security status. Furthermore, it may be also possible to differentiate between a number of more than two security levels. In this case, the security level may be indicated by changing a color of an optical signaling, displaying the determined security status by a number or a text or any other appropriate optical signaling. Additionally or alternatively, the security status may be also provided by any other kind of signaling, for example an acoustical signaling. In a possible example, a sound signal may be provided depending on the determined security status. It may be possible to output a sound with high frequency if a first security status is determined, and a sound of a low frequency if another security status is determined. Furthermore, it may be possible to output a sound signal as long as the security status is below a predetermined threshold.

In order to ensure a secure communication, a transmission of sensitive data is only performed if monitoring device 11 determines a security status which is equal or higher than a predetermined threshold value. For this purpose, a user may specify a minimum required security level. Alternatively, the minimum required security level may be also provided by any other mechanism. For instance, the security level may depend on the authentication of the user, or the minimum required security level may depend on the type of data which are to be transmitted through the communication system.

Accordingly, a communication between the first node 10 and the second node 20 is only established if the security status determined by the monitoring device 11 is equal or higher than the desired minimum security level. Otherwise, if the determined security level is less than the predetermined minimum security level, a communication is rejected.

Furthermore, it may be also possible to adapt the setting of the communication system based on a required security level. For example, a configuration of the first node 10, the second node 20 and/or the transmission path 30 between the first node 10 and the second node 20 may be automatically configured depending on the required minimum security level. For example, the communication path 30 may be limited to communication channels fulfilling a required minimum security level. It may be also possible to limit the transmission path 30 to transmission paths which only comprise devices like gateways, routers, switches, etc. which fulfill requirements regarding the minimum security level. Furthermore, it may be possible to configure the second node 20 and/or the first node 10 depending on the requirements of the minimum security level. If no automatic configuration can be achieved which fulfills the minimum security level, a communication is rejected and a respective indication is provided by indicating device 12.

Figure 2:
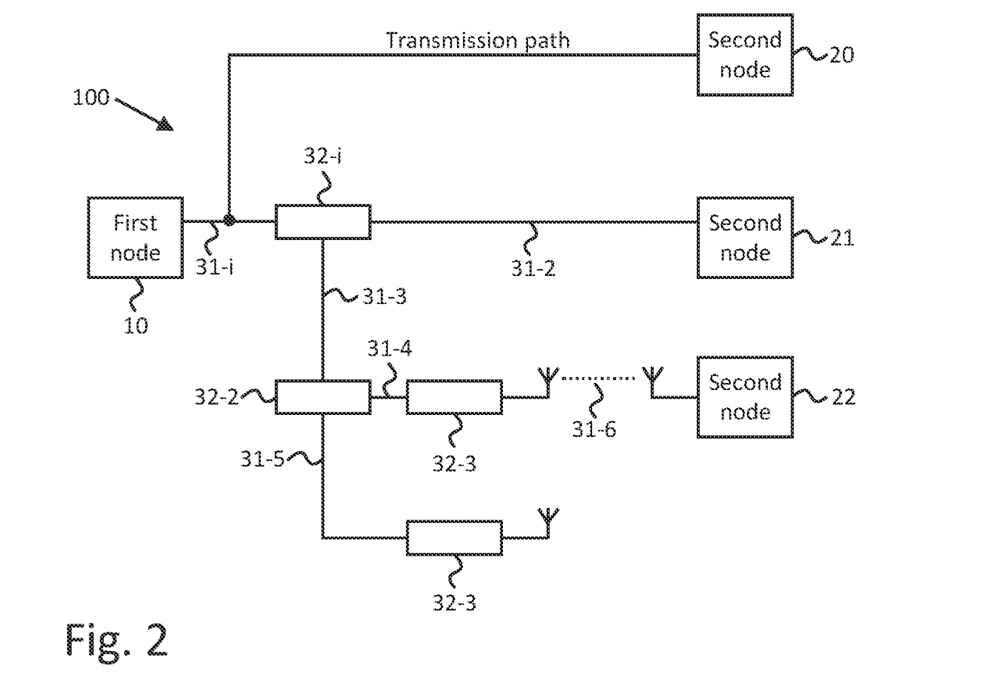
FIG. 2 shows a block diagram of another embodiment of a system according to the present invention.

FIG. 2 shows a block diagram of a further embodiment of a communication system 100 according to the present invention. The communication system 100 according to FIG. 2 differs from the previously described communication system in that the communication system in FIG. 2 comprises a number of more than two second nodes 20 to 22. Further to this, all explanations which have been already provided in conjunction with FIG. 1 also apply to the embodiment of FIG. 2.

As can be seen in FIG. 2, the communication system 100 comprises a first node 10 and three second nodes 20 to 22. However, it is understood that the present invention is not limited to a number of three second nodes. Furthermore, any other number of second nodes may be also possible. The first node 10 is connected with the number of second nodes 20 to 22 by a transmission path 30. The transmission path 30 may comprise, for example a communication network or the like. In particular, the communication path 30 may be separated into multiple segments 31-$i$. the individual segments 31-$i$ may be connected with each other by devices 32-$i$, for example gateways, routers, bridges, etc. Some of the network segments 31-$i$ may be wired communication paths. Furthermore, some of the segments 31-$i$ may wireless communication paths, for example over the air (OTA) paths. The network devices 32-$i$ may be devices for a transmission between a wired and a wireless transmission path, devices for routing a communication to a particular node, etc. It is understood that any other appropriate device within the transmission path 30 may be also possible.

When assessing the security status of the communication between the first node 10 and the second nodes 20 to 22, monitoring device 11 may consider all security relevant information of each related element 31-$i$, 32-$i$.

Accordingly, depending on the related transmission path segments 31-$i$ and the network devices 32-$i$, different security levels may be determined for a communication between the first node 10 and each of the second nodes 20 to 22. For example, an over the air communication in a communication path between the first node 10 and one of the second nodes 20 to 22 may cause a lower security level. Accordingly, individual security levels may be determined for each communication between the first node 10 and one of the second nodes 20 to 22. In this case, indicating unit 12 may indicate the multiple different security levels for each of the second nodes 20 to 22. Additionally or alternatively, it may be also possible to determine a group security level considering an overall security level for a communication of the first node 10 with each of the second nodes 20 to 22. In this case, monitoring device 11 may determine an aggregated group security status taking into account all information regarding the security of each related element. Usually, the aggregated group security level may be influenced by the lowest security level of the transmission segments 31-$i$, the network devices 32-$i$ and the second nodes 20 to 22.

In order to increase the security level of the communication system 100 with all related second nodes 20 to 22, a routing of the communication between the first node 10 and the second nodes 20 to 22 may be changed to eliminate a transmission path segment 31-$i$ or network devices 32-$i$ having a low security level. Furthermore, it may be also possible to disconnect a communication to the one or more second network nodes 20 to 22 having a communication link with a low security status. However, any other scheme for adapting the security status of the communication system 100 may be also possible.

Furthermore, it may be possible to identify all second nodes 20 to 22 having a predetermined security level or a security level which is equal or higher than a predetermined security level. The identified second nodes 20 to 22 may be grouped together as a specific group. This specific group may be used for simplifying an operation. For example, the specific group may be used as a preselection for establishing a communication between the first node 10 and the second nodes 20 to 22 of the specific group. In this way, the communication can be established with the second nodes 20 to 22 having the required predetermined security level. For example, the communication may be established automatically based on the identified second nodes 20 to 22. Alternatively, the identified signals 20 to 22 may be provided to a user as a shortcut, or a list of all second nodes 20 to 22 may be provided, wherein the identified a second nodes 20 to 22 are selected as a kind of preselection. However, it is understood that any other kind of operation based on the identified second nodes 20 to 22 having the required predetermined security level may be also possible.

Figure 3:
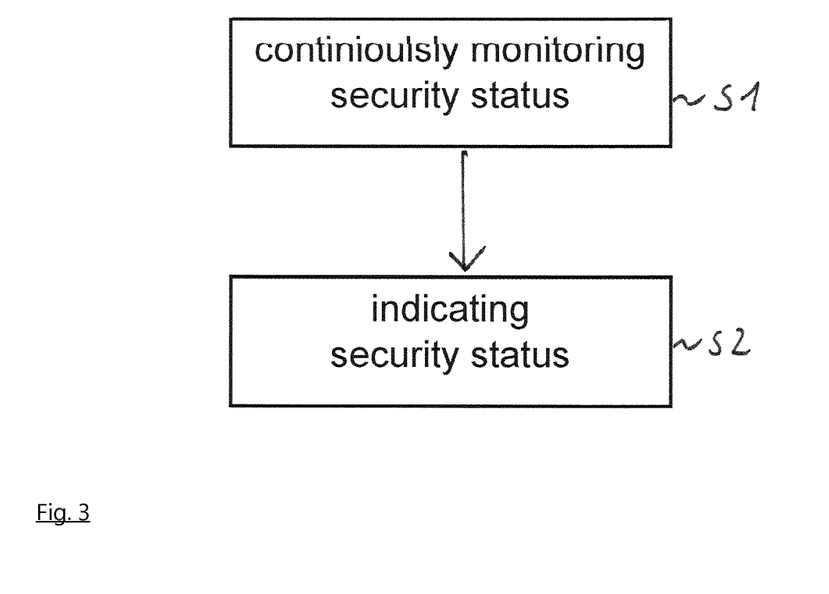
FIG. 3 shows a flow diagram of an embodiment of a method according to the present invention.

FIG. 3 shows a flow diagram illustrating a method for monitoring a secure communication of a communication system 100. In particular, the method may be applied to the communication system as described above in connection with FIG. 1 and FIG. 2. Thus, all operating steps described above may be also applied to the method described in the following.

The method may comprise a step S1 of continuously monitoring a security status of at least one second node 20 to 22. The monitoring of the security status may be performed by monitoring device 11 of a first node 10. The method further comprises a step S2 of indicating the continuously monitored security status. The continuously monitored security status may be indicated, for example by an indicating device 12 of the first node 10. In particular, the security status indicates the degree of the security protection of a communication link between the first node 10 and the at least one second node 20 to 22.

Summarizing, the present invention relates to an assessment of security of a communication system. The security of the communication system is continuously monitored and the result of this assessment is indicated. In particular, characteristic security information provided by a communication partner may be continuously received and evaluated for determining the security status. In this way, a change of the security status can be immediately recognized. Thus, a transmission of sensible or confidential data over an insecure communication network can be avoided.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A communication system for monitoring a secure communication, the communication system comprising:
a first node; and
at least one second node;
wherein the first node is communicatively coupled with the at least one second node by a transmission path, and
the first node comprises a processor and a memory communicatively coupled to the processor and having stored instructions to cause the processor to:
continuously monitor a security status of the at least one second node and to indicate the continuously monitored security status,
compare the determined security status with a predetermined minimum security level and reject a communication if the determined security status is less than the predetermined minimum security level,
wherein the security status is indicating a degree of security protection of a communication link between the first node and the at least one second node;
wherein the at least one second node is adapted to provide characteristic information related to a security level of the second node, and
wherein the first node comprises a further memory for storing relationships between security levels and characteristic information received from the at least one second node,
wherein the instructions of the first node further cause the processor to continuously receive the characteristic information provided by the at least one second node and to determine the security status of the at least one second node based on the received characteristic information; and
the instructions of the first node further cause the processor to compute the security status of the at least one second node by comparing the received characteristic information with security conditions prestored in the further memory.

2. The system of claim 1, wherein the transmission path comprises at least one of a wired communication link, wireless communication link, relay, gateway, network bridge and switch.

3. The system of claim 1, wherein the first node and the at least one second node are communicatively coupled by a transmission path comprising at least two parts, and
wherein the instructions of the first node are further to cause the processor to continuously monitor the security status of the at least one second node based on security levels of the at least two parts of the transmission path.

4. The system of claim 1, wherein the instructions of the first node are further to cause the processor to generate an alert if the security status is below a predefined threshold level.

5. The system of claim 1, wherein the security status of the at least one second node comprises at least two predefined security levels.

6. The system of claim 1, wherein a communication between the first node and the at least one second node comprises a packet based communication.

7. The system of claim 1, wherein the instructions of the first node are further to cause the processor to compute an individual security status for each message transmitted through the communication system.

8. The system of claim 1, wherein the instructions of the first node are further to cause the processor to configure the first node or the at least one second node according to a predetermined minimum security level.

9. The system of claim 1, wherein the characteristic information comprise at least one of authentication of a user, configuration parameter of the related second node, a checksum and information related to a transmission path.

10. The system of claim 1, comprising at least two second nodes, wherein the instructions of the first node are further to cause the processor to automatically group a number of second nodes having a predetermined security level.

11. The system of claim 1, comprising at least two second nodes, wherein the instructions of the first node are further to cause the processor to compute an aggregated group security level for a group of at least two second nodes.

12. The system of claim 11, wherein the instructions of the first node are further to cause the processor to compute individual security levels for each of the at least two second nodes.

13. A method for monitoring a secure communication of a communication system comprising a first node and at least one second node communicatively coupled to the first node by a transmission path, the method comprising:
continuously monitoring a security status of the at least one second node by a monitoring device of the first node;
comparing the determined security status with a predetermined minimum security level, and rejecting a communication if the determined security status is less than the predetermined minimum security level;
indicating the continuously monitored security status by an indication device of the first node;
storing relationships between security levels and characteristic information related to a security level in a memory,
providing, by the at least one second node, characteristic information related to a security level of the respective second node, wherein the characteristic information provided by the at least one second node are received and the security status of the at least one second node is continuously determined based on the received characteristic information by the first node; and
computing the security status of the at least one second node by the first node by comparing the received characteristic information with security conditions pre-stored in the memory;
wherein the security status indicates a degree of security protection of a communication link between the first node and the at least one second node.

\* \* \* \* \*